United States Patent [19]

Middleton

[11] 3,907,885

[45] Sept. 23, 1975

[54] TETRAFLUORODITHIOSUCCINYL DIFLUORIDE AND METHOD OF PREPARING SAME

[75] Inventor: William J. Middleton, Chadds Ford, Pa.

[73] Assignee: E. I. Du Pont de Nemours and Company, Wilmington, Del.

[22] Filed: June 4, 1974

[21] Appl. No.: 476,317

[52] U.S. Cl. ............... 260/543 F; 116/161; 260/79
[51] Int. Cl.² ...................................... C07C 153/00
[58] Field of Search ................................. 260/543 F

[56] References Cited
UNITED STATES PATENTS 2,962,529  11/1960  Marquis ........................... 260/543 F
3,069,395  12/1962  Middleton ....................... 260/543 F
3,117,977   1/1964  Middleton ....................... 260/543 F

FOREIGN PATENTS OR APPLICATIONS 868,459  5/1961  United Kingdom ............. 260/543 F

OTHER PUBLICATIONS

Middleton et al., J. Org. Chem. 30, 13–75, (1965).

*Primary Examiner*—John F. Terapane

[57] ABSTRACT

Tetrafluorodithiosuccinyl difluoride is prepared by reacting trifluorovinyl iodide with sulfur in the vapor phase. The product is polymerized by ionic polymerization to polymers which are corrosion resistant and have nonstick surfaces.

2 Claims, No Drawings

TETRAFLUORODITHIOSUCCINYL DIFLUORIDE AND METHOD OF PREPARING SAME

BACKGROUND OF THE INVENTION

1. Field of the Invention

The invention relates to tetrafluorodithiosuccinyl difluoride, and polymers thereof.

2. Description of the Prior Art

In Jour. Org. Chem., vol. 30, pp. 1375–1384 (1965) Middleton et al. teach the reaction of chlorotrifluoroethylene with refluxing sulfur vapors, $$CF_2=CFCl + S \longrightarrow CF_2ClC\overset{\overset{S}{\|}}{F}$$

the reaction of bromotrifluoroethylene with refluxing sulfur vapors, $$CF_2=CFBr + S \longrightarrow CF_2BrC\overset{\overset{S}{\|}}{F}$$

and the reaction of tetrafluoroethylene with refluxing sulfur vapors.

$$CF_2=CF_2 + S \rightarrow CF_2=S + CF_3CF=S + CF_3-S-S-CF_3$$

In Jour. Polym. Sci., part A, vol. 3, pp. 4115–4129 (1965), Middleton et al. teach the polymerization of thioacyl fluorides.

$$nCF_2=S \rightarrow -(CF_2-S)_n-$$

SUMMARY OF THE INVENTION

In accordance with this invention the novel compound, tetrafluorodithiosuccinyl difluoride, has been discovered. This compound is prepared by reacting gaseous trifluoroiodoethylene with sulfur vapors at a temperature from about 400° to 600°C. Tetrafluorodithiosuccinyl difluoride can be polymerized to the novel polymer, poly(tetrafluorodithiosuccinyl difluoride), which is corrosion resistant and has non-stick surfaces. This polymer is prepared by polymerizing tetrafluorodithiosuccinyl difluoride in the presence of an ionic polymerization initiator at a temperature from about 0° to −120°C.

DETAILED DESCRIPTION OF THE INVENTION

Tetrafluorodithiosuccinyl difluoride is prepared in accordance with the equation:

$$2\ CF_2=CFI + 2S \longrightarrow F\overset{\overset{S}{\|}}{C}CF_2CF_2\overset{\overset{S}{\|}}{C}F + I_2 .$$

A convenient method of carrying out this reaction is to pass hot trifluoroiodoethylene gas into a vessel in which sulfur vapors are refluxing (about 445°C. at 776 mm Hg) and then passing the reaction effluent into a condenser system which will condense the liquid product below its boiling point of about 85°C.

Tetrafluorodithiosuccinyl difluoride is polymerized in accordance with the equation:

$$(n+1)\ F\overset{\overset{S}{\|}}{C}CF_2CF_2\overset{\overset{S}{\|}}{C}F + F^{\ominus} \longrightarrow F\!\!-\!\!\left[\begin{array}{c}F_2C-CF_2\\ |\quad\quad\ |\\ FC\quad\ CFS\\ \diagdown S\diagup\end{array}\right]_n\!\!\!\!-\!FC\underset{\diagdown S\diagup}{\overset{F_2C-CF_2}{|\quad\quad\ |}}C=S .$$

This polymerization is carried out in the presence of an ionic polymerization initiator. The polymerization can be carried out by either bulk or solution methods at temperatures ranging from about 0° down to about −120°C, or lower, and pressures varying over a wide range. The preferred temperature is in the range of about −50° to −100°C. and the preferred pressure is atmospheric. Under these preferred conditions solid polymers are obtained. The polymerization times required vary from about 1 hour to several days, e.g., about 3–4 days, depending on the particular operating conditions and the specific initiators being used.

Suitable solvents for the polymerization reaction include ethers such as dimethyl ether, diethyl ether, di-n-propyl ether, diisopropyl ether, methyl ethyl ether, 1,2-dimethoxyethane, methyl propyl ether, 2-methoxypropane, 2-methoxybutane and tetrahydrofuran, and hydrocarbons such as ethane, propane, butane, isobutane and pentane. Diethyl ether is a particularly effective solvent.

A wide variety of ionic initiators can be used in this process. Specific initiators that are operable include amides such as dimethylformamide, and N-methylacetamide; primary, secondary and tertiary amines such as triethylamine, diisopropylamine, N-methylmorpholine, tetrakis(dimethylamino)ethylene; phosphines such as triphenylphosphine; tetraalkyl and alkyl aryl ammonium chlorides having no hydrogen on the quaternary ammonium nitrogen such as tetraethylammonium chloride; cesium fluoride; and methal alkyls such as butyl lithium. Anionic initiators, particularly dimethylformamide, are especially suitable for making high molecular weight polymers. The ionic initiators are normally employed in concentrations ranging from about 0.2 to 20 percent by weight based on the monomer, but amounts as low as about 0.01 percent or even less, can be used effectively.

Poly(tetrafluorodithiosuccinyl difluoride) is resistant to acids and most common solvents, including nitric acid, gasoline, and fuel oil, and therefore can be used in the manufacture of articles that need to be resistant to these materials. For example, metal articles can be coated with a film of the polymer to provide corrosion resistance. Since poly(tetrafluorodithiosuccinyl difluoride) has a low coefficient of friction, objects can be coated with the polymer to provide non-stick surfaces or permanently lubricated surfaces.

EXAMPLES OF THE INVENTION

The following examples, illustrating the preparation of tetrafluorodithiosuccinyl difluoride and poly(tetrafluorodithiosuccinyl difluoride), are given without any intention that the invention be limited thereto. All percentages are by weight and temperatures are in degrees Centigrade.

EXAMPLE 1

PREPARATION OF TETRAFLUORODITHIOSUCCINYL DIFLUORIDE

A stream of nitrogen gas was bubbled into a flask containing 150 g (0.72 mole) of freshly distilled trifluoroiodoethylene, and the entrained vapors were then passed through a 500-ml flask having two necks 6 inches long and containing 150 g of sulfur heated to reflux, and then through a 12-inch horizontal wide-bore air condenser into an ice-cooled trap. Iodine crystals deposited in the air condenser, and a dark liquid condensed in the trap. The rate of nitrogen flow was adjusted so that the entire sample of trifluoroiodoethylene was added in about 2 hours. The condensate in the trap was distilled to give 41.32 g (61 percent) of tetrafluorodithiosuccinyl difluoride as a red-brown liquid: bp 84°–85.5°;

$\lambda_{max}$: 428 m$\mu$ ($\epsilon$ 46.5), 294 m$\mu$ ($\epsilon$ 171) and 220 m$\mu$ ($\epsilon$ 11,300);

$F^{19}$ nmr (CCl$_3$F): $\delta$ +66.2 ppm (m, 2F), −109.1 ppm (m, 4F).

Anal. Calcd for $C_4F_6S_2$: C, 21.24; F, 50.41; S, 28.35
Found: C, 21.34; F, 50.47; S, 28.47.

EXAMPLE 2

POLYMERIZATION OF TETRAFLUORODITHIOSUCCINYL DIFLUORIDE

A solution of 4.5 g of tetrafluorodithiosuccinyl difluoride in 50 ml of ether was cooled to −78°, and 1 drop of dimethylformamide was added. Cooling was continued for 2 hours, and then the reaction was warmed to room temperature. The precipitated polymer was collected on a filter, washed with ether and dried in air. There was obtained 2.3 g. of the polymer as a light pink powder, mp 242°–267° (viscous melt). No solvent was found for the polymer, but a film was pressed at 150° (10,000 lbs/in$^2$).

Anal. Calcd for $(C_4F_6S_2)_n$: C, 21.24; H, 0.00; F, 50.40; S, 28.35
Found : C, 21.31; H, 0.36; F, 50.15; S, 28.97

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

The embodiments of the invention in which an exclusive property or privilege is claimed are defined as follows:

1. Tetrafluorodithiosuccinyl difluoride.
2. The method of preparing tetrafluorodithiosuccinyl difluoride which comprises reacting trifluoroiodoethylene with sulfur vapors at a temperature from 400° to 600°C.

* * * * *